United States Patent
Yang et al.

(10) Patent No.: US 12,524,849 B2
(45) Date of Patent: Jan. 13, 2026

(54) METHOD FOR VIDEO ANTI-SHAKE PROCESSING, ELECTRONIC APPARATUS, AND STORAGE MEDIUM

(71) Applicant: Beijing Zitiao Network Technology Co., Ltd., Beijing (CN)

(72) Inventors: Song Yang, Beijing (CN); Yulong Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 176 days.

(21) Appl. No.: 18/472,001

(22) Filed: Sep. 21, 2023

(65) Prior Publication Data
US 2024/0013347 A1      Jan. 11, 2024

Related U.S. Application Data

(63) Continuation-in-part of application No. PCT/CN2022/085634, filed on Apr. 7, 2022, and a
(Continued)

(30) Foreign Application Priority Data

Apr. 8, 2021 (CN) .......................... 202110379627.2
Apr. 8, 2021 (CN) .......................... 202110379651.6

(51) Int. Cl.
*G06T 5/70* (2024.01)
*G06T 7/73* (2017.01)

(52) U.S. Cl.
CPC ............ *G06T 5/70* (2024.01); *G06T 7/73* (2017.01); *G06T 2207/10016* (2013.01)

(58) Field of Classification Search
CPC ... G06T 5/70; G06T 7/73; G06T 2207/10016; G06T 5/50; G06T 2207/20201; G06T 2207/30241
See application file for complete search history.

(56) References Cited

U.S. PATENT DOCUMENTS 5,982,421 A *  11/1999  Inou ..................... H04N 23/68
                                                        348/208.8
10,074,015 B1   9/2018  Grundmann et al.
(Continued)

FOREIGN PATENT DOCUMENTS

CN      103139568 A      6/2013
CN      103813099 A      5/2014
(Continued)

OTHER PUBLICATIONS

Alluri, Usha Kalyani. "Robust Video Stabilization and Quality Evaluation for Amateur Videos." (2016).*
(Continued)

*Primary Examiner* — Sarah Lhymn
(74) *Attorney, Agent, or Firm* — Astute IP Law Group

(57) ABSTRACT

An embodiment of the present disclosure relates to a method for video anti-shake processing, an electronic apparatus and a storage medium, and the method includes: determining a moving track of a shooting position of a video by performing feature point tracking between different image frames in the video, wherein the moving track indicates shooting positions of the different image frames in the video; performing smoothing processing on a shooting position of each of the different image frames in the moving track, to obtain a smooth track; deforming the video based on a difference between the smooth track and the moving track, to obtain an anti-shake processed video, wherein at least one of the moving track and the smooth track is dynamically determined for the different image frames in the video.

16 Claims, 5 Drawing Sheets

Related U.S. Application Data continuation-in-part of application No. PCT/CN2022/085382, filed on Apr. 6, 2022.

(56) References Cited

U.S. PATENT DOCUMENTS

| | | | |
|---|---|---|---|
| 2005/0275727 | A1 | 12/2005 | Lai et al. |
| 2009/0066799 | A1* | 3/2009 | Whitcombe ............ H04N 23/68 348/208.5 |
| 2009/0316010 | A1* | 12/2009 | Nomura ................. H04N 23/68 348/208.6 |
| 2012/0108292 | A1* | 5/2012 | Zhong .................... H04N 23/68 455/556.1 |
| 2013/0120600 | A1 | 5/2013 | Jin et al. |
| 2014/0132786 | A1 | 5/2014 | Saitwal et al. |
| 2014/0362240 | A1 | 12/2014 | Klivington et al. |
| 2015/0256755 | A1 | 9/2015 | Wu et al. |
| 2015/0326785 | A1* | 11/2015 | Tsubaki ................ H04N 23/685 348/208.2 |
| 2016/0140695 | A1 | 5/2016 | Yuan et al. |
| 2018/0077353 | A1* | 3/2018 | Chen ................... H04N 23/6845 |
| 2019/0260936 | A1* | 8/2019 | Imanishi ................ H04N 23/55 |
| 2022/0122230 | A1* | 4/2022 | Wang ................. H04N 23/6811 |

FOREIGN PATENT DOCUMENTS

| | | | | |
|---|---|---|---|---|
| CN | 105049678 | A | | 11/2015 |
| CN | 105450907 | A | | 3/2016 |
| CN | 105791705 | A | | 7/2016 |
| CN | 106878612 | A | | 6/2017 |
| CN | 108564554 | A | | 9/2018 |
| CN | 108596858 | A | | 9/2018 |
| CN | 108632501 | A | | 10/2018 |
| CN | 109089015 | A | | 12/2018 |
| CN | 106101535 | B | * 2/2019 | ......... H04N 5/23248 |
| CN | 110047091 | A | | 7/2019 |
| CN | 110139031 | A | | 8/2019 |
| CN | 110415186 | A | | 11/2019 |
| CN | 110519507 | A | | 11/2019 |
| CN | 110753181 | A | | 2/2020 |
| CN | 111225155 | A | | 6/2020 |
| CN | 111901678 | A | | 11/2020 |
| WO | 2014092193 | A1 | | 6/2014 |
| WO | 2018223381 | A1 | | 12/2018 |

OTHER PUBLICATIONS

Ying et al., "Research of Long Connection Cloud Push Service Based on Android Platform," China Computer & Communication, Article No. 1007-9767-(2017) 18-044-04, 4 pages, (English Translation of Abstract only).
First Office Action and Search Report in CN202110379627.2, mailed Aug. 30, 2023, 7 pages.
First Office Action and Search Report in CN202110379651.6, mailed Sep. 8, 2023, 7 pages.
Guo, Heng, "Research on Digital Video Stabilization Algorithm based on Android Platform," Master Thesis, University of Electronic Science and Technology of China, 2018, 75 pages.
International Search Report in PCT/CN2022/085382, mailed Jul. 6, 2022, 3 pages.
Wu et al., "Electronic Image Stabilization Algorithm Based on Harris Corner and Modified Hu-moments," Computer Engineering, Mar. 2013, vol. 39, No. 3, 7 pages.
Xie et al., "A Robust and Efficient Video Anti-shaking Algorithm for Low-end Smartphone Platforms," IEEE Transactions on Consumer Electronics, 2018, pp. 1-10.
Xiong et al., "A video stabilization algorithm based on feature tracking and mesh path motion," Computer Engineering & Science, May 2020, vol. 42, No. 5, pp. 843-850.
Yin, Ya-Nan, "Video Monitoring Image de Jitter Visual Monitoring Algorithm Optimization Simulation," China Academic Journal, Sep. 2017, vol. 34, No. 9, pp. 450-454.
International Search Report in PCT/CN2022/085634, mailed Jul. 12, 2022, 3 pages.

* cited by examiner

METHOD FOR VIDEO ANTI-SHAKE PROCESSING, ELECTRONIC APPARATUS, AND STORAGE MEDIUM

CROSS-REFERENCE TO RELATED APPLICATION

The present application is a continuation-in-part of the international application PCT/CN2022/085382 filed on Apr. 6, 2022, which claims priority to Chinese patent Application No. 202110379627.2, filed on Apr. 8, 2021 and titled "METHOD FOR VIDEO ANTI-SHAKE PROCESSING, ELECTRONIC APPARATUS, AND STORAGE MEDIUM". The present application is also a continuation-in-part of the international application PCT/CN2022/085634 filed on Apr. 7, 2022, which claims priority to Chinese patent Application No. 202110379651.6, filed on Apr. 8, 2021 and titled "METHOD FOR VIDEO ANTI-SHAKE PROCESSING, ELECTRONIC APPARATUS, AND STORAGE MEDIUM". All contents of the above-identified applications are incorporated in the present disclosure by reference.

TECHNICAL FIELD

The present disclosure relates to the technical field of video processing, and more particularly, to a method and device for video anti-shake processing, an electronic apparatus and a storage medium.

BACKGROUND

Along with rise of short videos, video shooting becomes more and more important. At present, a user generally uses handheld apparatus to carry out video shooting, which causes video shaking easily, resulting in poor video quality. Therefore, how to perform anti-shake processing on a video to improve the video quality is still the current to-be-solved problem.

SUMMARY

In order to solve the technical problem or at least partially solve the technical problem, the embodiment of the present disclosure provides a method and device for video anti-shake processing, an electronic apparatus and a storage medium.

In a first aspect, an embodiment of the present disclosure provides a method for video anti-shake processing, including: determining a moving track of a shooting position of a video by performing feature point tracking between different image frames in the video, wherein the moving track indicates shooting positions of the different image frames in the video; performing smoothing processing on a shooting position of each of the different image frames in the moving track, to obtain a smooth track; deforming the video based on a difference between the smooth track and the moving track, to obtain an anti-shake processed video. At least one of the moving track and the smooth track is dynamically determined for the different image frames in the video.

In a second aspect, an embodiment of the present disclosure further provides an electronic apparatus, including a memory and a processor. A computer program is stored in the memory. When the computer program is executed by the processor, the electronic apparatus is caused to implement the method for video anti-shake progressing of the first aspect.

In a third aspect, an embodiment of the present disclosure provides a non-volatile computer readable storage medium, a computer program is stored in the storage medium, and when the computer program is executed by a computing apparatus, the computing apparatus is caused to implement the method for video anti-shake progressing of the first aspect.

BRIEF DESCRIPTION OF DRAWINGS

The accompanying drawings are incorporated in and constitute a part of the description, illustrate embodiments consistent with the present disclosure and, together with the description, serve to explain the principles of the present disclosure.

In order to more clearly illustrate the technical solutions of the embodiments of the present disclosure or the related art, the drawings that need to be used in the description of the embodiments or the related art are briefly described below. Obviously, a person of ordinary skill in the art can obtain other drawings according to these drawings without involving any inventive effort.

DESCRIPTION OF EMBODIMENTS

In order to more clearly understand the above objects, features and advantages of the present disclosure, the aspects of the present disclosure are further described below. It should be noted that, in the case of no conflict, the embodiments of the present disclosure and the features in the embodiments may be combined with each other.

Numerous specific details are set forth in the following description to facilitate a sufficient understanding of the present disclosure, but the present disclosure may also be practiced otherwise than as described herein; obviously, the embodiments in the specification are only a part of the embodiments of the present disclosure rather than all of the embodiments.

Embodiment 1

Figure 1:
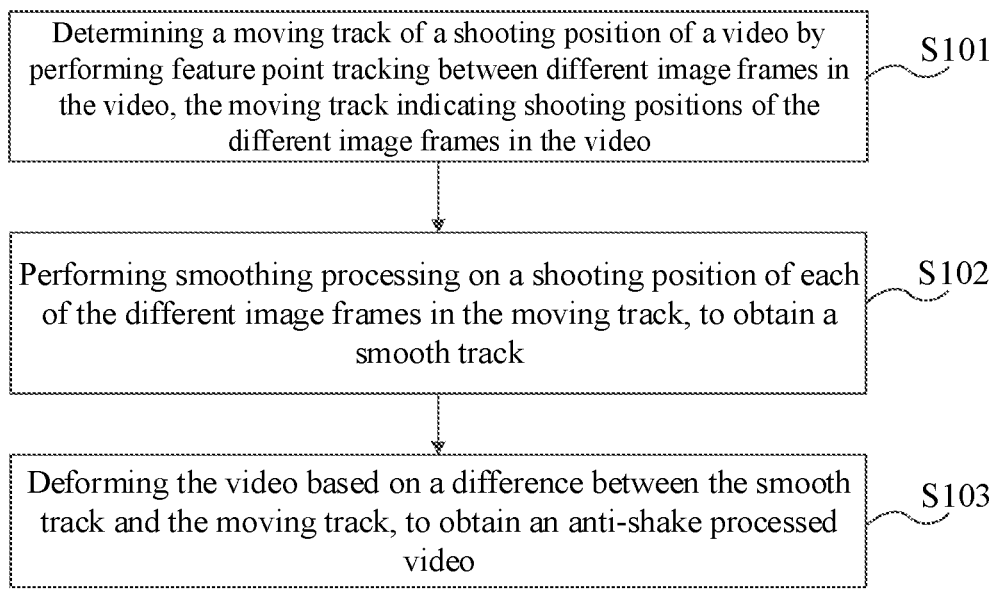
FIG. 1 is a flowchart of a method for video anti-shake processing provided by a first embodiment of the present disclosure.

FIG. 1 is a flowchart of a method for video anti-shake processing provided by an embodiment of the present disclosure, which can be suitable for a case of anti-shake processing of a video. The method can be executed by a video anti-shake processing device, and the device can be implemented by software and/or hardware and can be integrated on any electronic apparatus with computing capability, such as a terminal or a server.

In the embodiment of the present disclosure, the to-be-processed video can be a video being shot or a video having been shot. That is, the embodiment of the present disclosure can perform anti-shake processing on a video being shot in real time in a video shooting process, and it can also perform anti-shake processing on a video after video shooting is completed, both of which can achieve an effect of improving video quality.

As shown in FIG. 1, the method for video anti-shake processing provided by the embodiment of the present disclosure can include:

S101, determining a moving track of a shooting position of a video by performing feature point tracking between different image frames in the video, wherein the moving track indicates shooting positions of the different image frames in the video.

After acquiring a video to be processed, feature point tracking can be carried out between the different image frames in the video (for example, starting from a first frame of image in the video, to carry out feature point extraction and tracking on each frame of image in sequence) by using any available feature point extraction and tracking technology, to determine a matched feature point between different image frames (referring to a feature point for the same shot object in different image frames, and the number of the matched feature point may depend on circumstances). Then based on the matched feature point, the shooting positions of the different image frames in the video or a relative change amount between the shooting positions of the different image frames in the video is calculated, to obtain the moving track of the shooting position of the video (or referred to as a motion track of a shooting device for shooting the video). The moving track of the shooting position of the video being determined also means a shaking trend of the shooting position of the video being determined.

In an optional implementation, the moving track is represented by transformation matrices, and different transformation matrices in the moving track respectively represent the shooting positions of different image frames in the video. Correspondingly, determining the moving track of the shooting position of the video by performing feature point tracking between different image frames in the video includes: determining a transformation matrix between shooting position of different image frames in the video by performing feature point tracking between different image frames in the video, and determining the moving track of the shooting position of the video based on the transformation matrix between the shooting positions of different image frames in the video.

The transformation matrix may include a homography matrix, an affine transformation matrix, or a similarity transformation matrix. Different transformation matrices correspond to different degrees of freedom. The higher the degree of freedom of the transformation matrix is, the higher the corresponding motion fitting capability is. A type of the transformation matrix can be flexibly selected according to requirements in an actual processing process. Specific calculation of the transformation matrix can be realized with reference to the related art.

In the process of determining the moving track based on a plurality of transformation matrices, one frame of image can be selected from the video as a reference frame (which can be determined flexibly). Then a transformation matrix of the shooting position of each frame of image relative to the reference frame is determined based on the transformation matrix between the shooting positions of different image frames. Finally the required moving track is obtained based on the transformation matrix of the shooting position of each frame of image relative to the reference frame.

Taking a case, in which the reference frame is a first frame of image in the video and different image frames in the video refer to two adjacent frames of images, as an example, determining the moving track of the shooting position of the video by performing feature point tracking between different image frames in the video includes:
   determining a feature point matched between the two adjacent frames of images by carrying out feature point tracking on the two adjacent frames of images in the video, and calculating a transformation matrix between shooting positions of the two adjacent frames of images based on the matched feature point;
   based on the transformation matrix between the shooting positions of the two adjacent frames of images, determining a transformation matrix of a shooting position of each frame of image in the video relative to a shooting position of a first frame of image in the video;
   based on a transformation matrix of the shooting position of each frame of image in the video relative to the first frame of image in the video, determining the moving track of the shooting position of the video.

For example, it is assumed that a video V contains n frames of images, the i-th frame of image is denoted as $f_i$, then the video is $V=\{f_1, f_2, \ldots, f_{n-1}, f_n\}$, and a following processing is sequentially performed on each frame of image of the video:
   1) for the i-th frame of image $f_i$, extracting a feature point, which is denoted as $p_i$;
   2) tracking the feature point $p_i$ of a previous frame of image on the (i+1)-th frame of image $f_{i+1}$. The tracked feature point is denoted as $p_{i \to i+1}$, namely, $p_i$ and $p_{i \to i+1}$ are respectively feature points successfully matched on the i-th frame of image $f_i$ and the (i+1)-th frame of image $f_{i+1}$;
   3) according to a correspondence between $p_i$ and $p_{i \to i+1}$, fitting a transformation matrix of a shooting position from the i-th frame of image $f_i$ to the (i+1)-th frame of image $f_{i+1}$. The transformation matrix is denoted as $T_i$;
   4) performing cumulative processing, for example, performing multiplication calculation (which can be specifically determined according to actual processing), on transformation matrices of the i-th frame of image $f_i$ and between every two adjacent frames of images before the i-th frame of image, to obtain the transformation matrix of the shooting position of the i-th frame of image $f_i$ relative to the shooting position of the first frame of image, which is expressed as follows:

$$C_i = \sum_{t=1}^{i} T_t$$

A transformation matrix of each frame of image in the video relative to the shooting position of the first frame of image is obtained in sequence. Then the moving track of the shooting position of the video can be expressed as $C=\{C_1, C_2, \ldots, C_{n-1}, C_n\}$, where n represents the number of frames of images included in the video.

S102, performing smoothing processing on each of the shooting positions of different image frames in the moving track, to obtain a smooth track.

The moving track of the shooting position of the video being obtained also means the shaking trend of the shooting position of the video being determined. Any available smoothing processing algorithm in the related art, such as the Gaussian smoothing processing algorithm and the like, can be used to perform smoothing processing on the shooting positions of different image frames in the moving track, to obtain the smooth track. For example, the smooth track can be expressed as $Ć\{Ć_1, Ć_2, \ldots, Ć_{n-1}, Ć_n\}$. The smooth track indicates the shooting positions of different image frames in the smoothed video after the smoothing processing.

S103, based on a difference between the smooth track and the moving track, deforming the video, to obtain an anti-shake processed video. At least one of the moving track and the smooth track is dynamically determined for different image frames in the video.

By comparing the smooth track e with the moving track C before smoothing, an adjustment parameter $W=\{W_1, W_2, \ldots, W_{n-1}, W_n\}$ can be determined, where each sub-value in the adjustment parameter W is $W_i=Ć_i-C_i$, and n represents the number of frames of images included in the video. Then according to a correspondence between each sub-value in the adjustment parameter and each frame of image in the video, deformation processing can be performed, based on each sub-value in the adjustment parameter, on the corresponding image frame, so as to obtain an anti-shake processed video. In the deformation processing process, processing such as rotation, translation, zooming or cutting of a specific frame image can be executed according to actual processing requirements. That is, optionally, in the embodiment of the present disclosure, deforming the video based on the difference between the smooth track and the moving track to obtain the anti-shake processed video includes: determining the adjustment parameter based on the difference between the smooth track and the moving track; and deforming the video based on the adjustment parameter, to obtain the anti-shake processed video.

Dynamically determination of at least one of the moving track and the smooth track for different image frames in the video can be achieved by adaptively changing a transformation mode, a smoothing parameter and the like for different image frames in the video in the process of determining the moving track and/or the smooth track.

In the embodiment of the present disclosure, the smooth track and/or the moving track are dynamically determined for different image frames in the to-be-processed video, and then the video is deformed based on the difference between the smooth track and the moving track, so that the anti-shake processing of the video is realized. Compared with determining the smooth track and/or the moving track in a consistent and unchanged mode for different image frames, the embodiment of the present disclosure optimizes a video anti-shake processing effect and effectively improves the video quality.

Embodiment 2

Figure 2:
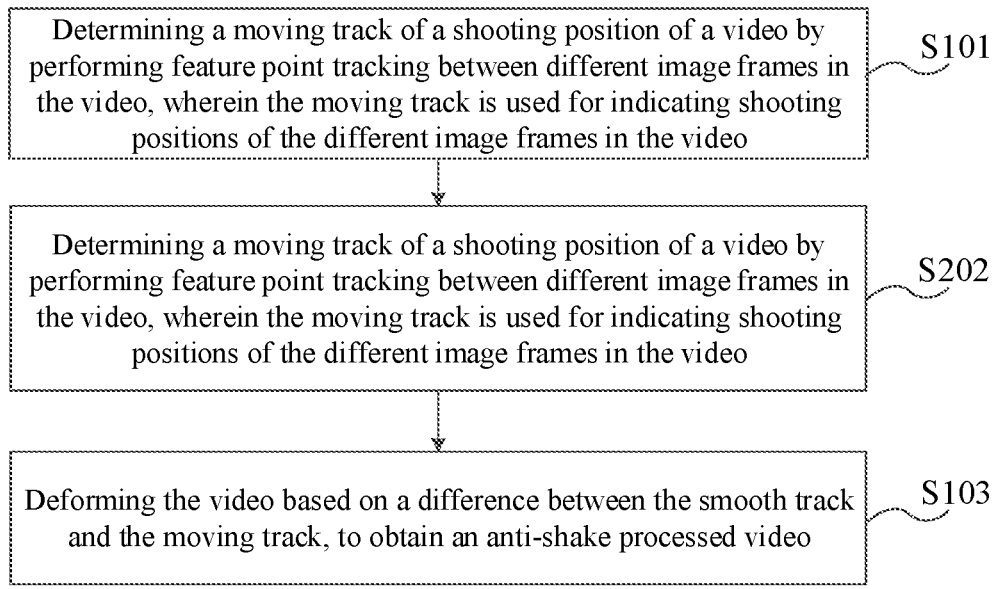
FIG. 2 is a flowchart of a method for video anti-shake processing provided by a second embodiment of the present disclosure.

Based on Embodiment 1, Embodiment 2 is provided. In the method for video anti-shake processing according to Embodiment 2, the smooth track is dynamically determined for different image frames in the video. As shown in FIG. 2, compared with the method of embodiment 1 shown in FIG. 1, operations S101 and S103 are the same, and a difference lies in that the operation of performing smoothing processing on the shooting position of each of the different image frames in the moving track to obtain the smooth track (marked as S102 in FIG. 1) specifically includes S202: based on a smooth radius corresponding to said each of the different image frames in the video, performing smoothing processing on each of the shooting positions of different image frames in the moving track to obtain the smooth track, wherein the smooth radius corresponding to each of the different image frames in the video is determined based on the number of the feature points used for tracking in said each of the different image frames in the video.

The number of the feature points used for tracking in each of the different image frames in the video (or referred to as a feature point on a subsequent frame of image successfully matching that on a previous frame of image) is related to the shot object on each frame of image. Taking a case where two adjacent frames of images are face images as an example, a complete face area is displayed on the previous frame of image, and the number of included feature points is relatively large, while only half of the face area is displayed on the subsequent frame of image, and the number of included feature points is relatively small. Then in the two adjacent frames of images, the feature points used for tracking on the subsequent frame of image can be only part of the feature points corresponding to a five-sense-organ area among the face feature points.

In the embodiment of the present disclosure, a correspondence between the number of the feature points and the smooth radius is preset, so that the smooth radius corresponding to the image frame can be dynamically determined according to the correspondence and the number of the feature points used for tracking on the image frame. The value of the smooth radius determines the number of image frames involved in the smoothing processing. The larger the number of the feature points used for tracking on the image frame (that is, there are more features), the more accurate the motion estimation of a shooting device used for shooting the video based on the image frame is. Thus, for the image frame, a relatively large smooth radius can be set, so that smoothing processing is performed on a shooting position of the image frame based on relatively more adjacent image frames, and a relatively large accumulated error will not be introduced. On the other hand, the smaller the number of the feature points on the image frame is (that is, there are less features), the less accurate the motion estimation of the shooting device used for shooting the video based on the image frame is. Thus, for the image frame, a relatively small smooth radius can be set, so that smoothing processing is performed on the shooting position of the image frame based on relatively less adjacent image frames, and a relatively large accumulated error is avoided, thereby finally optimizing the processing effect of the video anti-shake.

Optionally, the smooth radius corresponding to each of the different image frames in the video is determined based on a number interval into which the number of the feature points used for tracking in said each of the different image frames in the video falls, and a correspondence between number intervals and smooth radii. For example, the smooth radius $r_i$ corresponding to each frame of image $f_i$ in the video can be determined by using the following correspondence:

$$r_i = \begin{cases} r_0, & \text{if } n_i \geq m_1 \\ \frac{r_0}{2}, & \text{if } m_1 > n_i \geq m_2 \\ \frac{r_0}{4}, & \text{if } m_2 > n_i \geq m_3 \\ \frac{r_0}{8}, & \text{if } m_3 > n_i \end{cases}$$

where $m_1 > m_2 > m_3$, and each value can be flexibly set, for example, $m_1$ can be 50, $m_2$ can be 25, and $m_3$ can be 10; $n_i$ represents the number of the feature points for tracking in each frame of image $f_i$ relative to the previous frame of image; $r_0$ represents an initial value of the smooth radius, and its value can also be flexibly determined. It should be noted that in the above formula, for different feature point number intervals, a relationship between the value of the smooth radius $r_i$ and the initial value $r_0$ is only used as an example, and a ratio of value between $r_i$ and $r_0$ can be flexibly set according to processing requirements in actual processing.

By presetting the correspondence between the number intervals of the feature points and the values of the smooth radii, efficiency of determining the smooth radius corresponding to each frame of image can be improved.

In the embodiment of the present disclosure, the smoothing processing algorithm can be any available algorithm capable of realizing the smoothing processing effect in the related art, such as the Gaussian smoothing processing algorithm and the like. The smooth track obtained by means of smoothing processing may be expressed as, for example, $\acute{C}=\{\acute{C}_1, \acute{C}_2, \ldots, \acute{C}_{n-1}, \acute{C}_n\}$. The smooth track indicates the shooting positions of different image frames in the video after smoothing processing. For example, $\acute{C}_n$ represents a position which is the smoothed shooting position of the n-th frame of image in the video.

Optionally, said performing smoothing processing on the shooting position of each of the different image frames in the moving track based on the smooth radius corresponding to said each of the different image frames in the video to obtain the smooth track includes:
  based on the smooth radius corresponding to each frame of image in the video, determining a preset number of frames of images involved in each smoothing processing from the video;
  based on the shooting positions of the preset number of frames of images involved in each smoothing processing in the moving track, performing smoothing processing on the shooting position of each frame of image in the moving track, to obtain the smooth track. For example, weighted summation calculation can be carried out on the shooting positions of the preset number of frames of images involved in each smoothing processing in the moving track, and a calculation result is used as a smoothing result of the shooting position of the current frame of image.

In the embodiment of the present disclosure, based on the number of the feature points used for tracking on different image frames in the to-be-processed video, the smooth radius corresponding to different image frames in the video is dynamically determined. That is, the embodiment of the present disclosure achieves an effect of self-adaptively adjusting the smooth radius corresponding to different image frames in the video based on the number of the feature points on the image frame, then performs smoothing processing on the shooting positions of different image frames in the moving track of the shooting position of the video based on the smooth radii corresponding to different image frames in the video, and finally deforms the video based on the difference between the smooth track and the moving track, to achieve anti-shake processing of the video and optimize the video anti-shake processing effect. Compared with the case where the smooth radius is a uniform value, the embodiment of the present disclosure, through adopting the dynamic value of the smooth radius, effectively avoids a problem that when the number of the feature points used for tracking on the image frame is relatively small (or the number of the feature points used for feature matching is relatively small, that is, the feature is insufficient), the motion estimation of the shooting device for shooting the video is inaccurate, namely, estimation of the moving trend of the video shooting position is inaccurate, which leads to phenomena of video picture shaking and abnormal deformation, so the video quality is effectively improved.

Embodiment 3

Figure 3:
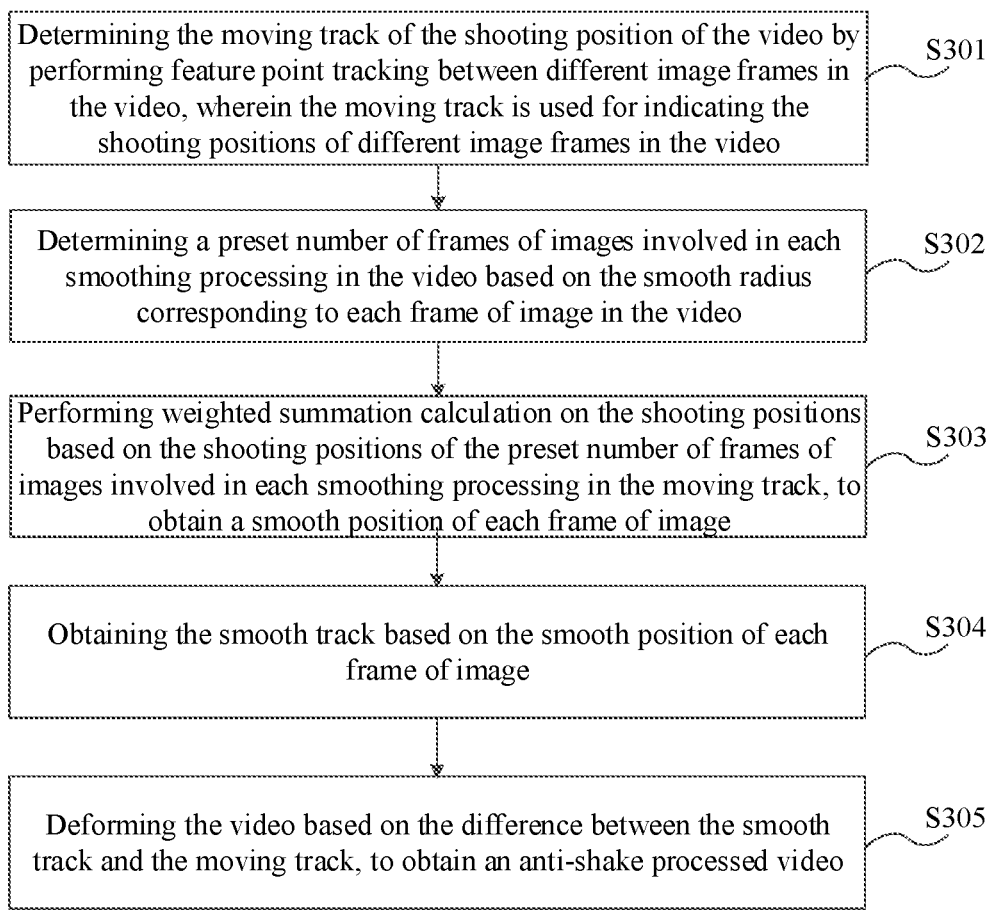
FIG. 3 is a flowchart of a method for video anti-shake processing provided by a third embodiment of the present disclosure.

FIG. 3 is a flowchart of a method for video anti-shake processing provided by Embodiment 3 of the present disclosure. It is further optimized and extended based on the above-mentioned Embodiment 2, and can be combined with each of the above optional implementations.

As shown in FIG. 3, the method for video anti-shake processing provided by the embodiment of the present disclosure can include:

S301, determining the moving track of the shooting position of the video by performing feature point tracking between different image frames in the video, wherein the moving track indicates the shooting positions of different image frames in the video.

S302, determining a preset number of frames of images involved in each smoothing processing from the video based on the smooth radius corresponding to each frame of image in the video.

Example 1, a first preset number of previous frames of images before said each frame of image from the video can be determined based on the smooth radius corresponding to said each frame of image in the video;
  each frame of image and the first preset number of previous frames of images are determined as the preset number of frames of images involved in each smoothing processing from the video; in this case, the value of the first preset number of frames can be the value of the smooth radius.

According to the embodiment of the present disclosure, anti-shake processing is performed on the video while shooting the video, and when the video shooting is completed, the video anti-shake processing ends, so that a shot video with better quality is obtained.

Example 2, based on the smooth radius corresponding to each frame of image in the video, a second preset number of previous frames of images before said each frame of image from the video can be determined, and the second preset number of subsequent frames of images after said each frame of image is determined;
  each frame of image, the second preset number of previous frames of images, and the second preset number of subsequent frames of images are determined as the preset number of frames of images involved in each smoothing processing in the video; in this case, the value of the second preset number of frames can be the value of the smooth radius.

According to the embodiment of the present disclosure, anti-shake processing can also be performed on a video of which shooting has been completed, a certain number of frames of images are taken before and after each frame of image, to be involved in smoothing processing of the shooting position of the frame of image in the moving track, and the effect of improving the video quality is also achieved.

S303, performing weighted summation calculation on the shooting positions based on the shooting positions of the preset number of frames of images involved in each smoothing processing in the moving track, to obtain a smooth position for each frame of image.

Taking a case, in which the moving track includes a plurality of transformation matrices, that is, the shooting position of each frame of image in the video can be expressed by a transformation matrix, as an example, the smooth position (namely, the smoothed shooting position) of each frame of image can be expressed in the form of matrix, hereinafter referred to as a smoothing matrix. Weights in the weighted summation calculation process can be taken adaptively, which is not specifically limited in the embodiments of the present disclosure.

Example 1, taking a case, in which a certain number of frames of images are taken before each frame of image according to the smoothing radius corresponding to each frame of image to be involved in smoothing processing of the shooting position of each frame of image, as an example, the smoothing matrix of each frame of image $f_i$ can be expressed as follows:

$$C'_i = \sum_{t=i}^{i+r} C_t * w_{i\sim t}$$

Example 2, taking a case, in which the same number of frames of images are taken before and after each frame of image according to the smoothing radius corresponding to each frame of image to be involved in smoothing processing of the shooting position of each frame of image, as an example, the smoothing matrix of each frame of image $f_i$ can be expressed as follows:

$$C'_i = \sum_{t=i-r}^{i+r} C_t * w_{i\sim t}$$

In the two Examples above, r is the smooth radius corresponding to each frame of image, $C_t$ represents the shooting position (or referred to as the transformation matrix) of each frame of image involved in the smoothing processing in the moving track C, $w_{i-t}$ is the weight of each frame of image involved in the smoothing processing, and its value can be adaptively set. After the smoothing matrix corresponding to each frame of image in the video is obtained, the smooth track can be expressed as follows:

$\acute{C}=\{\acute{C}_1,\acute{C}_2, \ldots ,\acute{C}_{n-1},\acute{C}_n\}$

Obtaining the smooth position corresponding to each frame of image by performing weighted summation calculation on the shooting positions of the preset number of frames of images in the moving track is simple and efficient in calculation, which can meet a requirement of real-time processing and can guarantee the smoothing processing effect of the moving track of the video shooting position.

S304, obtaining the smooth track based on the smooth position of each frame of image.

S305, deforming the video based on the difference between the smooth track and the moving track, to obtain an anti-shake processed video.

In the embodiment of the present disclosure, by dynamically determining the smooth radius corresponding to each frame of image according to the number of the feature points used for tracking in each frame of image in the to-be-processed video in the video anti-shake processing process, a certain number of image frames is dynamically determined to be involved in smoothing processing of the moving track of the video shooting position, thereby optimizing the video anti-shake processing effect. Compared with the case where a uniform value of the smooth radius is taken, the embodiment of the present disclosure, through dynamically taking a value of the smooth radius, effectively avoids a problem that when the number of the feature points used for tracking on the image frame in the video is relatively small, the motion estimation of the shooting device for shooting the video is inaccurate, namely, the movement trend estimation of the video shooting position is inaccurate, which will further lead to a phenomenon of video picture shaking and abnormal deformation, and the video quality is effectively improved.

Embodiment 4

Figure 4:
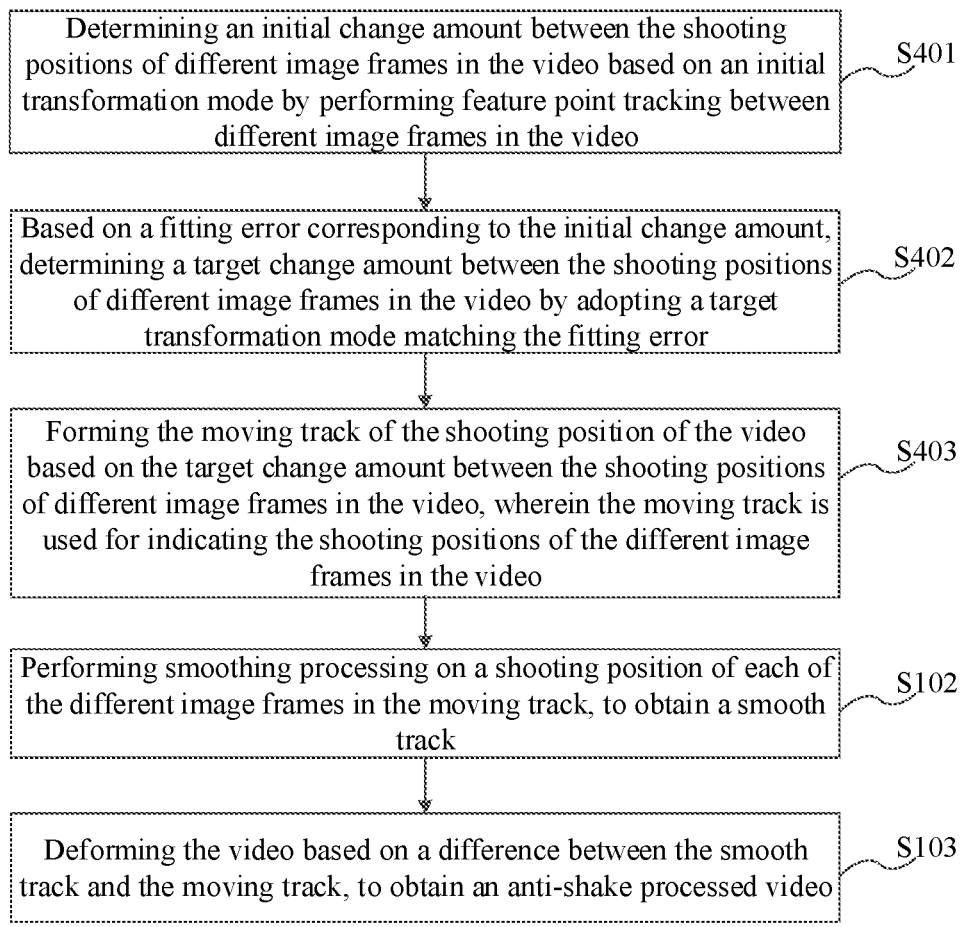
FIG. 4 is a flowchart of a method for video anti-shake processing provided by a fourth embodiment of the present disclosure.

Based on embodiment 1, Embodiment 4 is provided. In the method for video anti-shake processing according to Embodiment 4, the moving track is dynamically determined for different image frames in the video. As shown in FIG. 4, compared with the method of Embodiment 1 shown in FIG. 1, the operation S102 and the operation S103 are the same, and determining the moving track of the shooting position of the video by performing feature point tracking between different image frames in the video (marked as S101 in FIG. 1) specifically includes following operations.

S401, determining an initial change amount between the shooting positions of different image frames in the video based on an initial transformation mode by performing feature point tracking between different image frames in the video.

By performing feature point tracking between different image frames in the video, a matched feature point between different image frames (referring to the feature point for the same shot object in different image frames, and the number of the matched feature point may depend on circumstances) can be determined, and then the initial change amount between the shooting positions of different image frames can be determined based on the initial transformation mode and the matched feature point. Feature point tracking can be implemented with reference to the related art, which is not specifically limited in the embodiments of the present disclosure. Different image frames in the video may be two adjacent frames of images in the video or may be images having an interval of at least two frames, such as the current frame and the first frame of image in the video. The initial transformation mode is a calculation mode which is used by default for calculating a change amount between the shooting positions of different image frames. For example, the initial transformation mode can be realized by adopting an initial transformation matrix used for characterizing the change of the shooting position, which specifically for example can be the homography matrix and the like. It should be understood that in the actual processing process, the initial transformation mode can be flexibly selected from a plurality of available transformation modes according to processing requirements, which is not specifically limited in the embodiment of the present disclosure.

The initial change amount between the shooting positions of different image frames can be, for example, a change amount of a shooting position of a subsequent frame of image relative to a shooting position of a previous frame of image. Taking a case where the initial transformation mode is implemented by adopting the initial transformation matrix as an example, the initial change amount between the shooting positions of different image frames can be a transformation matrix from the previous frame of image to the subsequent frame of image.

Optionally, the method for video anti-shake processing provided by the embodiment of the present disclosure further includes: calculating a fitting error corresponding to the initial change amount between the shooting positions of different image frames based on the initial transformation mode and a successfully matched feature point between different image frames. The fitting error can be used for evaluating whether selection of the initial transformation mode is reasonable or not, and then influence of the initial transformation mode on the anti-shake processing effect in the video anti-shake processing process is determined. In the process of calculating the fitting error, the initial transformation mode can be used to perform coordinate transformation on the feature point on the previous frame of image, or inverse transformation of the initial transformation mode can be used to perform coordinate transformation on the feature point on the subsequent frame of image, and then by comparing with an image coordinate of the feature point on another remaining frame of image, the fitting error corresponding to the initial change amount between the shooting positions of different image frames is calculated.

Furthermore, calculating the fitting error corresponding to the initial change amount between the shooting positions of different image frames based on the initial transformation mode and the successfully matched feature point between the different image frames can include:

performing coordinate transformation on a feature point on a previous frame of image among different image frames based on the initial transformation mode, to obtain a transformation coordinate of the feature point on the previous frame of image;

based on an image coordinate of the feature point on a subsequent frame of image among different image frames and the transformation coordinate of the feature point on the previous frame of image, calculating the fitting error corresponding to the initial change amount between the shooting positions of different image frames.

Exemplarily, a case, in which the initial transformation mode is realized by adopting the initial transformation matrix and different image frames in the video refer to two adjacent frames of images in the video, is taken as an example to give an exemplary description on the calculation of the fitting error, but it should not be understood as specific limitation of the embodiment of the present disclosure. It is assumed that the video V contains n frames of images, the i-th frame of image is denoted as $f_i$, then the video is V={$f_1$, $f_2$, ..., $f_{n-1}$, $f_n$,}, and a following processing is sequentially performed on each frame of image of the video:

1) for the i-th frame of image $f_i$, extracting a feature point, which is denoted as $p_i$;
2) tracking the feature point $p_i$ of a previous frame of image on the (i+1)-th frame of image $f_{i+1}$. The tracked feature point is denoted as $p_{i\sim i+1}$, namely, $p_i$ and $p_{i\sim i+1}$ are respectively matched feature points on the i-th frame of image $f_i$ and the (i+1)-th frame of image $f_{i+1}$;
3) according to a correspondence between $p_i$ and $p_{i\sim i+1}$, fitting an initial transformation matrix (that is, an initial change amount of the shooting position) from the i-th frame of image $f_i$ to the (i+1)-th frame of image $f_{i+1}$. The transformation matrix is denoted as $T_i$;
4) performing coordinate transformation on the matched feature point $p_i$ by using the initial transformation matrix $T_i$, to obtain a transformation coordinate, which is denoted as $T_i*p_i$;
5) comparing $T_i*p_i$ with $p_{i\sim i+1}$, and calculating the fitting error corresponding to the initial change amount between the shooting positions of the two adjacent frames of images.

Theoretically, the smaller the difference between $T_i*p_i$ and $p_{i\sim i+1}$ is, the smaller the fitting error is, and the better the motion fitting effect of the initial transformation matrix for different image frames is. Otherwise, the motion fitting effect of the initial transformation matrix for different image frames is poor, and the initial transformation matrix needs to be dynamically replaced, that is, the initial transformation mode needs to be dynamically replaced.

The specific calculation for obtaining the fitting error by utilizing the image coordinate of the feature point on the subsequent frame of image and the transformation coordinate of the feature point on the previous frame of image can be flexibly determined in actual processing. For example, difference calculation or quotient calculation may be performed on the image coordinate of each feature point on the subsequent frame of image and the transformation coordinate of the feature point on the previous frame of image according to the correspondence of the feature point on the two frames of images, and then the obtained various difference values or various quotient values are summed (including weighted summation), to obtain the fitting error corresponding to the initial change amount between the shooting positions of different image frames. Alternatively, an average value of various difference values or an average value of various quotient values can be calculated as the fitting error corresponding to the initial change amount between the shooting positions of different image frames.

S402, based on the fitting error corresponding to the initial change amount, determining a target change amount between the shooting positions of different image frames in the video based on a target transformation mode matching the fitting error.

The target transformation mode matching the fitting error can be determined according to the relationship between the fitting error and an error threshold, to improve the video anti-shake processing effect. The error threshold can be set as one value, and in this case, if the fitting error is smaller than the error threshold, the initial transformation mode can be determined as the target transformation mode matching the fitting error, and if the fitting error is greater than or equal to the error threshold, a transformation mode with a different degree of freedom from that of the initial transformation mode can be used as the target transformation mode, to achieve the effect of reducing the fitting error of the shooting positions between different image frames. The error threshold can also be set as a plurality of values in a hierarchical manner, each threshold corresponds to one transformation mode among a plurality of selectable transformation modes with different degrees of freedom, and the fitting error corresponding to the initial change amount between the shooting positions of different image frames obtained by using each transformation mode is also different. It should be noted that each threshold mentioned in the embodiment of the present disclosure can take a value flexibly in the actual processing process, which is not specifically limited in the embodiments of the present disclosure.

Exemplarily, the error threshold includes a first error threshold and a second error threshold, a value of the first error threshold is smaller than that of the second error threshold, and if the fitting error corresponding to the initial change amount between the shooting positions of different image frames in the video is smaller than the first error threshold, then the initial transformation mode is determined as the target transformation mode matching the fitting error, and the target transformation mode is adopted to determine the target change amount between the shooting positions of different image frames in the video; or if the fitting error corresponding to the initial change amount is greater than or equal to the first error threshold and smaller than the second error threshold, then a first transformation mode with a smaller degree of freedom than the initial transformation mode is determined as the target transformation mode matching the fitting error, and the target transformation mode is adopted to determine the target change amount between the shooting positions of different image frames in the video; or if the fitting error corresponding to the initial change amount is greater than or equal to the second error threshold, then a second transformation mode with a smaller degree of freedom than the first transformation mode is determined as the target transformation mode matching the fitting error, and the target transformation mode is adopted to determine the target change amount between the shooting positions of different image frames in the video.

Furthermore, the initial transformation mode includes the homography transformation mode, the first transformation mode includes the affine transformation mode, and the second transformation mode includes the similarity transformation mode.

The homography transformation is a transformation relationship from one plane to another plane, and it has eight degrees of freedom in total; the affine transformation is linear transformation between two-dimensional coordinates, and it keeps "straightness" and "parallelism" of a two-dimensional graph and mainly includes translation transformation, rotation transformation, scale transformation, inclination transformation (or referred as stagger transformation, shear transformation, offset transformation) and turnover transformation, and there are six degrees of freedom in total; compared with the affine transformation, there is no inclination transformation and turnover transformation in the similarity transformation, and there are four degrees of freedom in total.

One transformation relationship corresponds to one motion model, and a motion model with a higher degree of freedom (i.e., a transformation matrix with a higher degree of freedom) has a stronger fitting ability, but it is more prone to introducing a fitting error. Thus, in the video anti-shake processing process, a motion model with a high degree of freedom can be first used to fit motion between different image frames in the video, and then a motion model type between different image frames is dynamically adjusted according to the fitting error, that is, if the fitting error is too large, a motion model with the low degree of freedom is used for replacing the motion model with the high degree of freedom, so that introduction of a relatively large fitting error can be avoided with the smoothing effect reduced, to achieve balance between motion smoothing and the fitting error between different image frames, and ensure the final video anti-shake processing effect.

S403, forming the moving track of the shooting position of the video based on the target change amount between the shooting positions of different image frames in the video, wherein the moving track indicates the shooting positions of the different image frames in the video.

Exemplarily, one frame of image can be selected from the video as a reference frame of image, and the reference frame of image can be adaptively determined. Then the target change amount of the shooting position of each frame of image relative to the shooting position of the reference frame of image in the video is obtained by using the target change amount between the shooting positions of different image frames, so as to obtain the moving track of the shooting position of the video (or referred to as the moving track of the shooting device for shooting the video) based on a plurality of target change amounts.

Optionally, in the embodiments of the present disclosure, the initial change amount or the target change amount may be represented by using the transformation matrix, and then the moving track includes a plurality of transformation matrices, that is, different transformation matrices in the moving track may respectively represent shooting positions of different image frames in the video. Correspondingly, taking a case, in which the reference frame of image is the first frame of image in the video, as an example, forming the moving track of the shooting position of the video based on the target change amount between shooting positions of different image frames in the video includes:

determining a transformation matrix of each frame of image in the video relative to the first frame of image based on the target transformation matrix between the shooting positions of different image frames in the video;

forming the moving track of the shooting position of the video based on the transformation matrix of each frame of image in the video relative to the first frame of image.

Assuming that the target transformation matrix of the shooting position between the i-th frame of image $f_i$ and the (i+1)-th frame of image $f_{i+1}$ in the video is denoted as $T_i$, then the target transformation matrices of the shooting position of the i-th frame of image $f_i$ and between the different image frames before the i-th frame (such as every two adjacent frames of images) can be subjected to accumulation processing, for example, multiplication calculation (which can be specifically determined according to actual processing), to obtain the transformation matrix of the shooting position of the i-th frame of image $f_i$ relative to the shooting position of the first frame of image, which is expressed as follows:

$$C_i = \sum_{t=1}^{i} T_t$$

A transformation matrix of the shooting position of each frame of image in the video relative to the shooting position of the first frame of image is obtained in sequence, and the moving track of the shooting position of the video can be expressed as $C=\{C_1, C_2, \ldots, C_{n-1}, C_n\}$, where n represents the number of image frames included in the video.

In the embodiment of the present disclosure, firstly, the initial change amount between the shooting positions of different image frames in the video is determined based on the initial transformation mode, then based on the fitting error corresponding to the initial change amount, the target transformation mode matching the fitting error is adopted to determine the target change amount between the shooting positions of different image frames in the video, namely, the fitting error can be used for evaluating whether selection of the initial transformation mode is reasonable or not; secondly, the moving track of the shooting position of the video is formed based on the target change amount between the shooting positions of different image frames in the video;

and finally, the video anti-shake processing effect is achieved through track smoothing processing and video deformation processing. According to the embodiment of the present disclosure, the effect of dynamically determining the target transformation mode between different image frames in the video based on the fitting error corresponding to the initial change amount between the shooting positions of different image frames in the video is realized, the video anti-shake processing effect is ensured, introduction of excessive fitting error is avoided, and the video quality is effectively improved.

Embodiment 5

Figure 5:
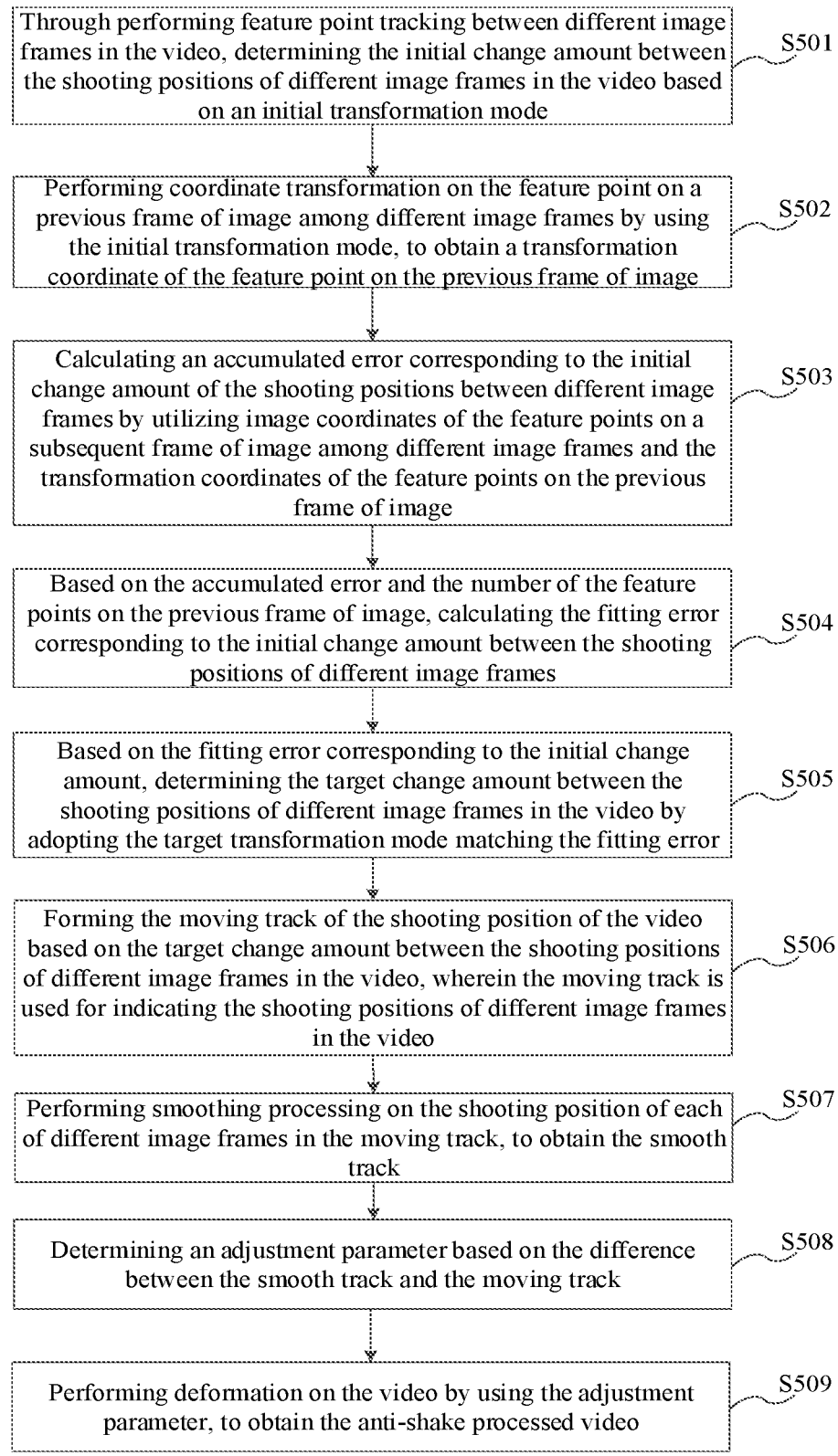
FIG. 5 is a flowchart of a method for video anti-shake processing provided by a fifth embodiment of the present disclosure.

FIG. 5 is a flowchart of a method for video anti-shake processing provided by Embodiment of the present disclosure, and it is further optimized and extended based on the above technical solution and can be combined with the various optional implementations described above.

As shown in FIG. 5, the method for video anti-shake processing provided by the embodiment of the present disclosure can include:

S501, through performing feature point tracking between different image frames in the video, determining the initial change amount between the shooting positions of different image frames in the video based on an initial transformation mode.

S502, performing coordinate transformation on the feature point on the previous frame of image among different image frames by using the initial transformation mode, to obtain a transformation coordinate of the feature point on the previous frame of image.

S503, calculating an accumulated error corresponding to the initial change amount between the shooting positions of different image frames by utilizing the image coordinate of the feature point on the subsequent frame of image among different image frames and the transformation coordinate of the feature point on the previous frame of image.

Exemplarily, taking the i-th frame of image $f_i$ and the (i+1)-th frame of image $f_{i+1}$ in the video as an example, the number of the successfully matched feature points on the two frames of images is denoted as $M_i$, the j-th feature point on the i-th frame of image $f_i$ is denoted as $p_i^j$, a transformation coordinate corresponding to the j-th feature point can be expressed as $T_i * p_i^j$, where $T_i$ represents the initial change amount between the shooting positions of the i-th frame of image $f_i$ and the (i+1)-th frame of image $f_{i+1}$, and the j-th feature point on the (i+1)-th frame of image $f_{i+1}$ is denoted as $p_{i \sim i+1}^j$, then the accumulated error corresponding to the initial change amount between the shooting positions of the i-th frame of image $f_i$ and the (i+1)-th frame of image $f_{i+1}$ can be expressed as $\Sigma_{j=0}^{M_i}(T_i * p_i^j - p_{i \sim i+1}^j)$.

S504, based on the accumulated error and the number of the feature points on the previous frame of image, calculating the fitting error corresponding to the initial change amount between the shooting positions of different image frames.

Continuing with the above example, mean value calculation can be performed based on the cumulative error and the number of the feature points on the previous frame of image (equivalent to the number of the successfully matched feature points between different image frames) $M_i$, so as to obtain the fitting error $E_i$ corresponding to the initial change amount between the shooting positions of different image frames, which may be represented as follows:

$$E_i = \frac{1}{M_i}\sum_{j=0}^{M_i}(T_i * p_i^j - p_{i \sim i+1}^j)$$

Determining the fitting error corresponding to the initial change amount between the shooting positions of different image frames by performing the mean value calculation on a plurality of successfully matched feature points ensures accuracy of the fitting error calculation.

S505, based on the fitting error corresponding to the initial change amount, determining the target change amount between the shooting positions of different image frames in the video by adopting the target transformation mode matching the fitting error.

S506, forming the moving track of the shooting position of the video based on the target change amount between the shooting positions of different image frames in the video, wherein the moving track indicates the shooting positions of different image frames in the video.

S507, performing smoothing processing on each of the shooting positions of different image frames in the moving track, to obtain the smooth track.

Exemplarily, smoothing processing can be performed on each of the shooting positions of different image frames in the moving track based on a preset smooth radius, to obtain the smooth track. A value of the preset smooth radius determines the number of image frames involved in the smoothing processing, and its specific value can be flexibly determined in the actual processing process, which is not specifically limited in the embodiment of the present disclosure. Exemplarily, for each frame of image in the video, images of the preset frame number involved in the smoothing processing can be determined based on the preset smoothing radius; and then a smoothed shooting position corresponding to each frame of image is determined based on the shooting positions corresponding to the preset number of frames of images in the moving track. For example, weighted summation calculation can be performed on the shooting positions corresponding to the preset number of frames of images in the moving track, to obtain the smoothed shooting position corresponding to each frame of image. Subsequently, the smooth track is obtained based on the smoothed shooting position corresponding to each frame of image.

Optionally, determining the preset number of frames of images involved in the smoothing processing based on the preset smoothing radius may include: for each frame of image in the video, determining a first preset number of previous frames of images before each frame of image based on the preset smoothing radius; determining each frame of image and the first preset number (a value of which is the value of the preset smooth radius in the case) of previous frames of images as the preset number of frames of images involved in the smoothing processing; or, based on the preset smooth radius, determining a second preset number (in this case, a value of which is the value of the preset smoothing radius) of previous frames of images before each frame of image, and determining the second preset number of subsequent frames of images after each frame of image; and determining each frame of image, the second preset number of previous frames of images and the second preset number of subsequent frames of images as the preset number of frames of images involved in the smoothing processing.

Taking a case, where the same number of frames of images are taken before and after each frame of image according to the value of the preset smooth radius, and the smoothed shooting position corresponding to each frame of image is expressed by adopting a smooth matrix, as an example, the smooth matrix of each frame of image $f_i$ can be expressed as follows:

$$\acute{C}_i = \sum_{t=i-r}^{i+r} C_t * w_{i-t}$$

where r is the preset smoothing radius, $C_t$ is the transformation matrix (that is, the shooting position) corresponding to each frame of image involved in the smoothing processing in the moving track C, $w_{i-t}$ is the weight of each frame of image involved in the smoothing processing, and a value of the weight can be adaptively set, which is not specifically limited in the embodiments of the present disclosure. After the smooth matrix of each frame of image is obtained, the smooth track can be expressed as $\acute{C}=\{\acute{C}_1, \acute{C}_2, \ldots, \acute{C}_{n-1}, \acute{C}_n\}$.

S508, determining an adjustment parameter based on the difference between the smooth track and the moving track.

For example, the moving track C before smoothing can be subtracted from the smooth track $\acute{C}$ of the shooting device, to obtain the adjustment parameter $W=\{W_1, W_2, \ldots, W_{n-1}, W_n\}$, and each sub-value in the adjustment parameter W may be expressed as $W_i=\acute{C}_i-C_i$.

S509, performing deformation on the video by using the adjustment parameter, to obtain the anti-shake processed video.

According to the correspondence between each sub-value in the adjustment parameter and each frame of image in the video, deformation processing can be performed on the corresponding image frame based on each sub-value in the adjustment parameter, so that the anti-shake processed video is obtained.

In the embodiment of the present disclosure, by calculating the fitting error corresponding to the initial change amount between the shooting positions of different image frames in the video, the dynamic determination of the available transformation mode between different image frames according to the fitting error is realized, the video anti-shake processing effect is ensured, introduction of excessive fitting error is avoided, and the video quality is effectively improved.

It should be understood that the above embodiments can be combined in any suitable manner. For example, Embodiment 2 may be combined with Embodiment 4, such that both the moving track and the smooth track are dynamically determined for different image frames in the video.

Embodiment 6

Figure 6:
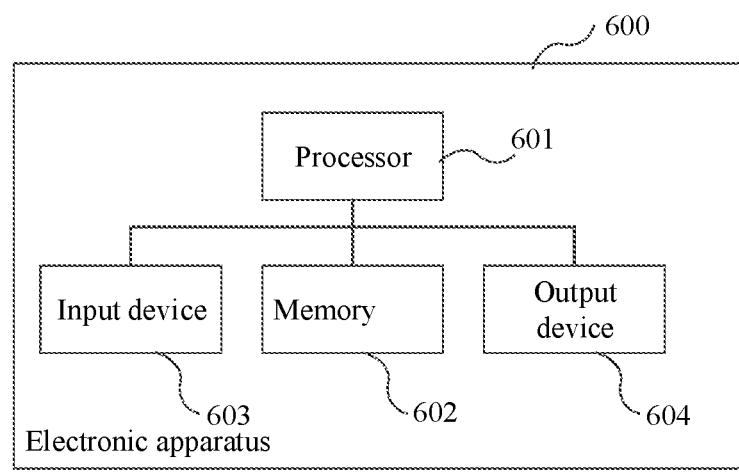
FIG. 6 is a structural schematic diagram of an electronic apparatus according to an embodiment of the present disclosure.

FIG. 6 is a structural schematic diagram of an electronic apparatus according to an embodiment of the present disclosure, which is used for exemplary description of the electronic apparatus implementing the method for video anti-shake processing provided in the embodiments of the present disclosure. The electronic apparatus may include, but is not limited to, a mobile terminal such as a mobile phone, a notebook computer, a digital broadcast receiver, a PDA (personal digital assistant), a PAD (tablet computer), a PMP (portable multimedia player), a vehicle-mounted terminal (such as a vehicle-mounted navigation terminal), and the like, and a fixed terminal such as a digital TV, a desktop computer, a smart home device, a wearable electronic apparatus, a server, and the like. The electronic apparatus shown in FIG. 6 is merely an example and should not bring any limitation to the functions and occupancy ranges of the embodiments of the present disclosure.

As shown in FIG. 6, the electronic apparatus 600 includes one or more processors 601 and a memory 602.

The processor 601 may be a central processing unit (CPU) or other forms of processing units having data processing capabilities and/or instruction execution capabilities, and it may control other components in the electronic apparatus 600 to perform desired functions.

The memory 602 may include one or more computer program products, and the computer program product may include various forms of computer-readable storage media, such as volatile memory and/or non-volatile memory. The volatile memory may include, for example, a random-access memory (RAM) and/or a cache, and the like. The non-volatile memory may include, for example, a read-only memory (ROM), a hard disk, a flash memory, and the like. One or more computer program instructions may be stored on the computer readable storage medium, and the processor 601 may run the program instruction, to realize the method for video anti-shake processing provided by the embodiment of the present disclosure, and to further realize other desired functions. Various content such as input signals, signal components, noise components, etc. may also be stored in the computer-readable storage medium.

The method for video anti-shake processing provided by the embodiment of the present disclosure can include: determining the moving track of the shooting position of the video by performing feature point tracking between different image frames in the video, the moving track indicating the shooting positions of different image frames in the video; performing smoothing processing on a shooting position of each of different image frames in the moving track, to obtain the smooth track; and deforming the video based on the difference between the smooth track and the moving track, to obtain the anti-shake processed video, wherein at least one of the moving track and the smooth track is dynamically determined for different image frames in the video. It should be understood that the electronic apparatus 600 may further perform other alternative embodiments provided by the embodiments of the present disclosure.

In one example, the electronic apparatus 600 may also include: an input device 603 and an output device 604 that are interconnected by a bus system and/or other forms of connection mechanisms (not shown).

In addition, the input device 603 may further include, for example, a keyboard, a mouse, and the like.

The output device 604 can output various information to outside, including determined distance information and direction information and the like. The output device 604 may include, for example, a display, a speaker, a printer, and a communications network and a remote output device connected thereto, etc.

Of course, for simplicity, only some of the components related to the present disclosure in the electronic apparatus 600 are shown in FIG. 6, and components such as buses, input/output interfaces, and the like are omitted. In addition, according to specific application conditions, the electronic apparatus 600 may further include any other suitable components.

Besides the method and the apparatus described above, the embodiment of the present disclosure can also be a computer program product which includes a computer program or a computer program instruction, and when the computer program or the computer program instruction is operated by the processor, the computing apparatus is caused to realize any method for video anti-shake processing provided by the embodiment of the present disclosure.

The computer program product may be written in one or any combination of more programming languages to write program code for performing operations of the embodiments of the present disclosure, and the programming languages include object-oriented programming languages, such as Java, C++, and conventional procedural programming languages, such as "C" languages or similar programming languages. The program code may be executed entirely on the user's electronic apparatus, executed partly on the user's electronic apparatus, executed as a stand-alone software package, executed partly on the user's electronic apparatus and partly on a remote electronic apparatus, or executed entirely on the remote electronic apparatus.

In addition, the embodiment of the present disclosure can also provide a computer readable storage medium, a computer program instruction is stored on the computer readable storage medium, and when the computer program instruction is operated by the processor, the electronic apparatus is caused to realize any method for video anti-shake processing provided by the embodiment of the present disclosure.

The method for video anti-shake processing provided by the embodiment of the present disclosure can include: determining the moving track of the shooting position of the video by performing feature point tracking between different image frames in the video, the moving track indicating the shooting positions of different image frames in the video; performing smoothing processing on a shooting position of each of different image frames in the moving track, to obtain the smooth track; and deforming the video based on the difference between the smooth track and the moving track, to obtain the anti-shake processed video, wherein at least one of the moving track and the smooth track is dynamically determined for different image frames in the video. It should be understood that when the computer program instruction is run by the processor, the computing apparatus can be caused to implement other alternative embodiments provided by the method embodiment of the present disclosure.

The computer-readable storage medium may employ one or any combination of more readable media. The readable medium may be a readable signal medium or a readable storage medium. The readable storage medium may include, for example, but not limited to, an electrical, magnetic, optical, electromagnetic, infrared, or semiconductor system, device, or component, or any combination thereof. More specific examples (non-exhaustive lists) of the readable storage media include: electrically connected by one or more wires, portable computer disk, hard disk, random access memory (RAM), read-only memory (ROM), erasable programmable read-only memory (EPROM or flash memory), optical fiber, portable compact disk read-only memory (CD-ROM), optical storage component, magnetic storage component, or any suitable combination thereof.

It should be noted that, in this context, relational terms such as "first" and "second" are merely used to distinguish one entity or operation from another entity or operation, without necessarily requiring or implying any such actual relationship or order between these entities or operations. It should be noted that, in this description, the terms "including", "comprising", or any other variant thereof are intended to cover a non-exclusive inclusion, such that a process, method, article, or device including a series of elements includes not only those elements, but also includes other elements not explicitly listed, or includes elements inherent to such a process, method, article, or device. In the absence of more restrictions, elements limited by a sentence "includes one . . . " don't exclude that other identical elements are also present in the processes, methods, articles, or devices that include the elements.

The above are merely specific embodiments of the present disclosure, so that those skilled in the art can understand or implement the present disclosure. Various modifications to these embodiments will be apparent to those skilled in the art, and general principles defined herein may be implemented in other embodiments without departing from the spirit or scope of the present disclosure. Thus, the present disclosure will not be limited to these embodiments described herein but be accorded the widest scope consistent with the principles and novel features disclosed herein.

What is claimed is:

1. A method for video anti-shake processing, comprising:
   determining a moving track of a shooting position of a video by performing feature point tracking between different image frames in the video, wherein the moving track indicates shooting positions of the different image frames in the video;
   performing smoothing processing on a shooting position of each image frame of the different image frames in the moving track, to obtain a smooth track; and
   deforming the video based on a difference between the smooth track and the moving track, to obtain an anti-shake processed video,
   wherein the smooth track is dynamically determined for the different image frames in the video, and
   said performing smoothing processing on the shooting position of each image frame of the different image frames in the moving track to obtain the smooth track comprises:
   performing smoothing processing on the shooting position of each image frame of the different image frames in the moving track based on a smooth radius corresponding to the image frame in the video to obtain the smooth track, wherein the smooth radius corresponding to each image frame of the different image frames in the video is determined based on a number interval into which the number of the feature points used for tracking in the image frame in the video falls, and a correspondence between number intervals and smooth radii.

2. The method according to claim 1, wherein said performing smoothing processing on the shooting position of each image frame of the different image frames in the moving track based on the smooth radius corresponding to the image frame in the video to obtain the smooth track comprises:
   determining, based on the smooth radius corresponding to each frame of image in the video, a preset number of frames of images involved in each smoothing processing from the video; and
   performing, based on the shooting positions of the preset number of frames of images involved in each smoothing processing in the moving track, smoothing processing on the shooting position of each frame of image in the moving track, to obtain the smooth track.

3. The method according to claim 2, wherein said determining, based on the smoothing radius corresponding to each frame of image in the video, the preset number of frames of images involved in each smoothing processing from the video comprises:
   based on the smooth radius corresponding to each frame of image in the video, determining a first preset number of previous frames of images before the frame of image from the video; and determining each frame of image and the first preset number of previous frames of images as the preset number of frames of images involved in each smoothing processing from the video; or based on the smooth radius corresponding to each frame of image in the video, determining a second preset number of previous frames of images before the frame of image from the video, and determining the second preset number of subsequent frames of images after the frame of image from the video; and determining each frame of image, the second preset number of previous frames of images and the second preset number of subsequent frames of images as the preset number of frames of images involved in each smoothing processing from the video.

4. The method according to claim 2, wherein said performing, based on the shooting positions of the preset number of frames of images involved in each smoothing processing in the moving track, smoothing processing on the shooting position of each frame of image in the moving track to obtain the smooth track comprises:

performing, based on the shooting positions of the preset number of frames of images involved in each smoothing processing in the moving track, weighted summation calculation on the shooting positions, to obtain a smooth position for each frame of image; and obtaining the smooth track based on the smooth position for each frame of image.

5. The method according to claim 1, wherein the moving track is represented by transformation matrices, and different transformation matrices in the moving track respectively represent the shooting positions of the different image frames in the video, and said determining the moving track of the shooting position of the video by performing feature point tracking between the different image frames in the video comprises:

determining a transformation matrix between the shooting positions of the different image frames in the video by performing feature point tracking between the different image frames in the video, and determining the moving track of the shooting position of the video based on the transformation matrix between the shooting positions of the different image frames in the video.

6. The method according to claim 1, wherein said deforming the video based on the difference between the smooth track and the moving track to obtain the anti-shake processed video comprises:

determining an adjustment parameter based on the difference between the smooth track and the moving track; and deforming the video based on the adjustment parameter to obtain the anti-shake processed video.

7. The method according to claim 1, wherein the moving track is dynamically determined for the different image frames in the video, and said determining the moving track of the shooting position of the video by performing feature point tracking between the different image frames in the video comprises:

determining an initial change amount between the shooting positions of the different image frames in the video based on an initial transformation mode by performing feature point tracking between the different image frames in the video;

determining a target change amount between the shooting positions of the different image frames in the video based on a target transformation mode matching a fitting error corresponding to the initial change amount; and forming the moving track of the shooting position of the video based on the target change amount between the shooting positions of the different image frames in the video, wherein the moving track indicates the shooting positions of the different image frames in the video.

8. The method according to claim 7, further comprising:

performing coordinate transformation on a feature point on a previous frame of image among the different image frames based on the initial transformation mode, to obtain a transformation coordinate of the feature point on the previous frame of image; and calculating the fitting error corresponding to the initial change amount between the shooting positions of the different image frames based on an image coordinate of the feature point on a subsequent frame of image among the different image frames and the transformation coordinate of the feature point on the previous frame of image.

9. The method according to claim 8, wherein said calculating the fitting error corresponding to the initial change amount between the shooting positions of the different image frames based on the image coordinate of the feature point on the subsequent frame of image among the different image frames and the transformation coordinate of the feature point on the previous frame of image comprises:

calculating an accumulated error corresponding to the initial change amount between the shooting positions of the different image frames, based on image coordinates of feature points on the subsequent frame of image among the different image frames and transformation coordinates of feature points on the previous frame of image; and calculating the fitting error corresponding to the initial change amount between the shooting positions of the different image frames, based on the accumulated error and the number of the feature points on the previous frame of image.

10. The method according to claim 7, wherein said determining the target change amount between the shooting positions of the different image frames in the video based on the target transformation mode matching the fitting error corresponding to the initial change amount comprises:

when the fitting error corresponding to the initial change amount is smaller than a first error threshold, determining the initial transformation mode as the target transformation mode matching the fitting error, and determining the target change amount between the shooting positions of the different image frames in the video based on the target transformation mode; or when the fitting error corresponding to the initial change amount is greater than or equal to the first error threshold and smaller than a second error threshold, determining a first transformation mode with a smaller degree of freedom than the initial transformation mode as the target transformation mode matching the fitting error, and determining the target change amount between the shooting positions of the different image frames in the video based on the target transformation mode; or when the fitting error corresponding to the initial change amount is greater than or equal to the second error threshold, determining a second transformation mode with a smaller degree of freedom than the first transformation mode as the target transformation mode matching the fitting error, and determining the target change amount between the shooting position of the different image frames in the video based on the target transformation mode.

11. The method according to claim 10, wherein the initial transformation mode comprises a homography transformation mode, the first transformation mode comprises an affine transformation mode, and the second transformation mode comprises a similarity transformation mode.

12. The method according to claim 7, wherein the initial change amount or the target change amount is represented by a transformation matrix, and
   said forming the moving track of the shooting position of the video based on the target change amount between the shooting positions of the different image frames in the video comprises:
   determining a transformation matrix of each frame of image in the video relative to a first frame of image based on the target transformation matrix between shooting positions of the different image frames in the video; and
   forming the moving track of the shooting position of the video based on the transformation matrix of each frame of image in the video relative to the first frame of image.

13. An electronic device, comprising a memory and a processor, wherein the memory has a computer program stored thereon, the computer program, when executed by the processor, causes the electronic device to implement a method for video anti-shake progressing, the method comprising:
   determining a moving track of a shooting position of a video by performing feature point tracking between different image frames in the video, wherein the moving track indicates shooting positions of the different image frames in the video;
   performing smoothing processing on a shooting position of each image frame of the different image frames in the moving track, to obtain a smooth track; and
   deforming the video based on a difference between the smooth track and the moving track, to obtain an anti-shake processed video,
   wherein the smooth track is dynamically determined for the different image frames in the video, and
   said performing smoothing processing on the shooting position of each image frame of the different image frames in the moving track to obtain the smooth track comprises:
   performing smoothing processing on the shooting position of each image frame of the different image frames in the moving track based on a smooth radius corresponding to the image frame in the video to obtain the smooth track, wherein the smooth radius corresponding to each image frame of the different image frames in the video is determined based on a number interval into which the number of the feature points used for tracking in the image frame in the video falls, and a correspondence between number intervals and smooth radii.

14. The electronic device according to claim 13, wherein the moving track is dynamically determined for the different image frames in the video, and
   said determining the moving track of the shooting position of the video by performing feature point tracking between the different image frames in the video comprises:
   determining an initial change amount between the shooting positions of the different image frames in the video based on an initial transformation mode by performing feature point tracking between the different image frames in the video;
   determining a target change amount between the shooting positions of the different image frames in the video based on a target transformation mode matching a fitting error based on the fitting error corresponding to the initial change amount; and
   forming the moving track of the shooting position of the video based on the target change amount between the shooting positions of the different image frames in the video, wherein the moving track indicates the shooting positions of the different image frames in the video.

15. A non-volatile computer readable storage medium, having a computer program stored thereon, the computer program, when executed by a computing device, causes the computing device to implement a method for video anti-shake progressing, the method comprising:
   determining a moving track of a shooting position of a video by performing feature point tracking between different image frames in the video, wherein the moving track indicates shooting positions of the different image frames in the video;
   performing smoothing processing on a shooting position of each image frame of the different image frames in the moving track, to obtain a smooth track; and
   deforming the video based on a difference between the smooth track and the moving track, to obtain an anti-shake processed video,
   wherein the smooth track is dynamically determined for the different image frames in the video, and
   said performing smoothing processing on the shooting position of each image frame of the different image frames in the moving track to obtain the smooth track comprises:
   performing smoothing processing on the shooting position of each image frame of the different image frames in the moving track based on a smooth radius corresponding to the image frame in the video to obtain the smooth track, wherein the smooth radius corresponding to each image frame of the different image frames in the video is determined based on a number interval into which the number of the feature points used for tracking in the image frame in the video falls, and a correspondence between number intervals and smooth radii.

16. The non-volatile computer readable storage medium according to claim 15, wherein the moving track is dynamically determined for the different image frames in the video, and
   said determining the moving track of the shooting position of the video by performing feature point tracking between the different image frames in the video comprises:
   determining an initial change amount between the shooting positions of the different image frames in the video based on an initial transformation mode by performing feature point tracking between the different image frames in the video;
   determining a target change amount between the shooting positions of the different image frames in the video based on a target transformation mode matching a fitting error based on the fitting error corresponding to the initial change amount; and forming the moving track of the shooting position of the video based on the target change amount between the shooting positions of the different image frames in the video, wherein the moving track indicates the shooting positions of the different image frames in the video.

* * * * *